May 17, 1955     E. S. MacPHERSON     2,708,594
VEHICLE FILLER TUBE AND LICENSE PLATE ARRANGEMENT
Filed July 14, 1950     2 Sheets-Sheet 1

E. S. MacPHERSON
INVENTOR.

BY E. C. McRae
J. P. Faulkner
J. H. Oster

ATTORNEYS

May 17, 1955  E. S. MacPHERSON  2,708,594
VEHICLE FILLER TUBE AND LICENSE PLATE ARRANGEMENT
Filed July 14, 1950  2 Sheets-Sheet 2

E S MacPHERSON
INVENTOR.

BY E. C. McRae
J. R. Faulkner
L. H. Oster
ATTORNEYS

United States Patent Office 2,708,594
Patented May 17, 1955

2,708,594

VEHICLE FILLER TUBE AND LICENSE PLATE ARRANGEMENT

Earle S. MacPherson, Detroit, Mich., assignor to Ford Motor Company, Dearborn, Mich., a corporation of Delaware Application July 14, 1950, Serial No. 173,714

7 Claims. (Cl. 296—28)

This invention relates generally to a vehicle body construction and has particular reference to the fuel tank filler tube and license plate arrangement for a motor vehicle.

It is common in motor vehicle design to mount the fuel tank on the chassis adjacent the rearward end thereof with the filler tube extending upwardly from one side of the tank and projecting through the rear fender or rear side panel of the body. This construction not only mars the appearance of one side of the vehicle, but makes it inconvenient to fill the tank from the opposite side of the car. Furthermore, the construction requires a relatively along filler tube connected to the fuel tank spout by means of a flexible hose and clamp, and the construction is often complicated by the necessity of passing the filler tube through the side of the luggage compartment and also the wheel housing.

It is an object of the present invention to provide an improved vehicle body construction in which a relatively short filler tube extends upwardly and rearwardly from the rear central portion of the fuel tank, with the filler tube extending through the lower back panel of the body in a central location transversely of the vehicle. This arrangement permits a relatively short tube to be used and eliminates the necessity for a flexible connection between the filler tube and the fuel tank, and in addition does not materially interfere with the luggage compartment space or with the sheet metal construction of the body.

A further object of the present invention is to provide a centrally located filler tube of the type mentioned above in combination with a hinged lid normally concealing the filler tube and cap from view yet permitting access to the latter for filling purposes. A further object is to provide the filler tube lid with license plate mounting means whereby the license plate may be carried by the lid. The necessity for a separate license plate bracket is thus eliminated.

Still another object of the invention is to provide a construction of the type mentioned above in which the license plate bracket is pivotally mounted on the vehicle body for swinging movement between a first position in which the license plate is generally upright for ready observation and the filler tube and cap are concealed, and a second position is in which the filler tube is exposed and accessible for filling purposes. Spring means are provided for automatically returning the license plate and bracket to their normal upright position when released.

Other objects and advantages of this invention will be made more apparent as this description proceeds, particularly when considered in connection with the accompanying drawing, wherein.

Figure 1:
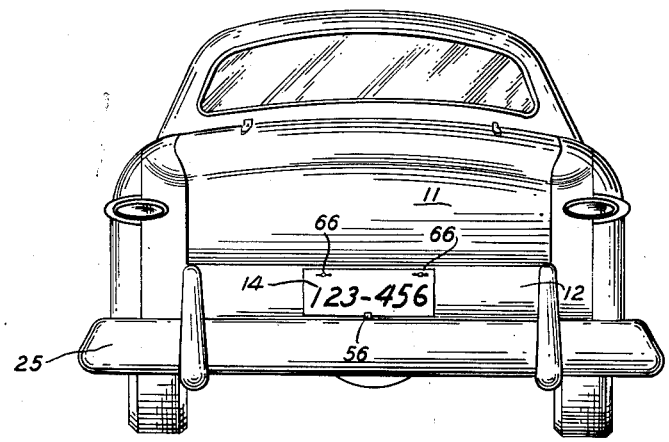
Figure 1 is a rear elevation view of a motor vehicle body incorporating the construction of the present invention.
Figure 2:
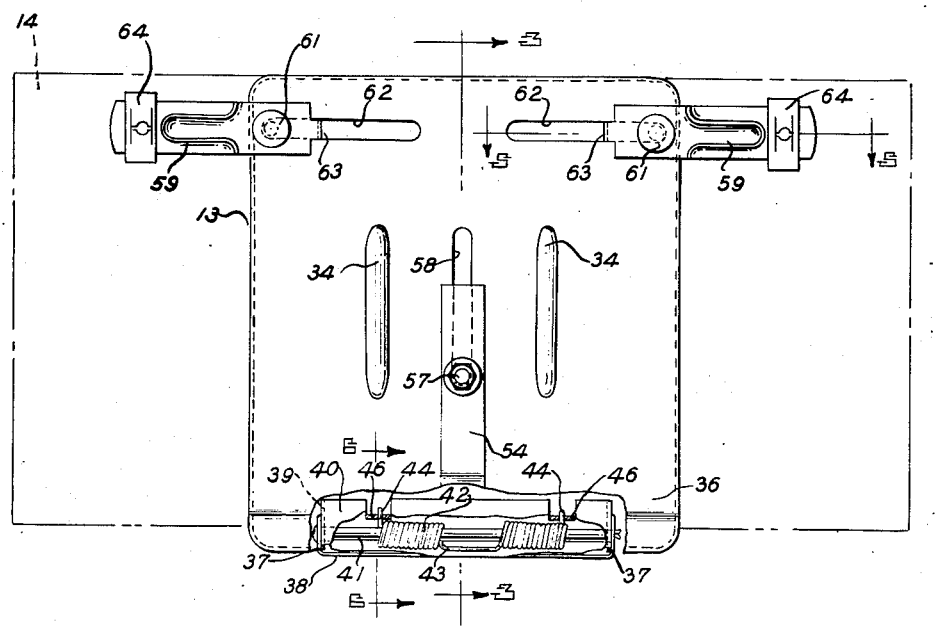
Figure 2 is an enlarged rear elevation view of a portion of the construction shown in Figure 1 with the license plate shown in phantom.

Referring now to the drawings, Figure 1 shows a motor vehicle passenger car body having a conventional hinged luggage compartment lid 11 and a fixed lower back body panel 12 beneath lower marginal edge of the lid. Pivotally mounted upon the lower back body panel 12 in a central position transversely of the vehicle body is a bracket or cover 13 supporting a license plate 14 in the manner to be described more fully hereinafter. In its normal upright position the license plate conceals the fuel tank filler tube located back of the plate, yet enables the filler tube to be readily accessible simply by swinging the plate downwardly.

Figure 3:
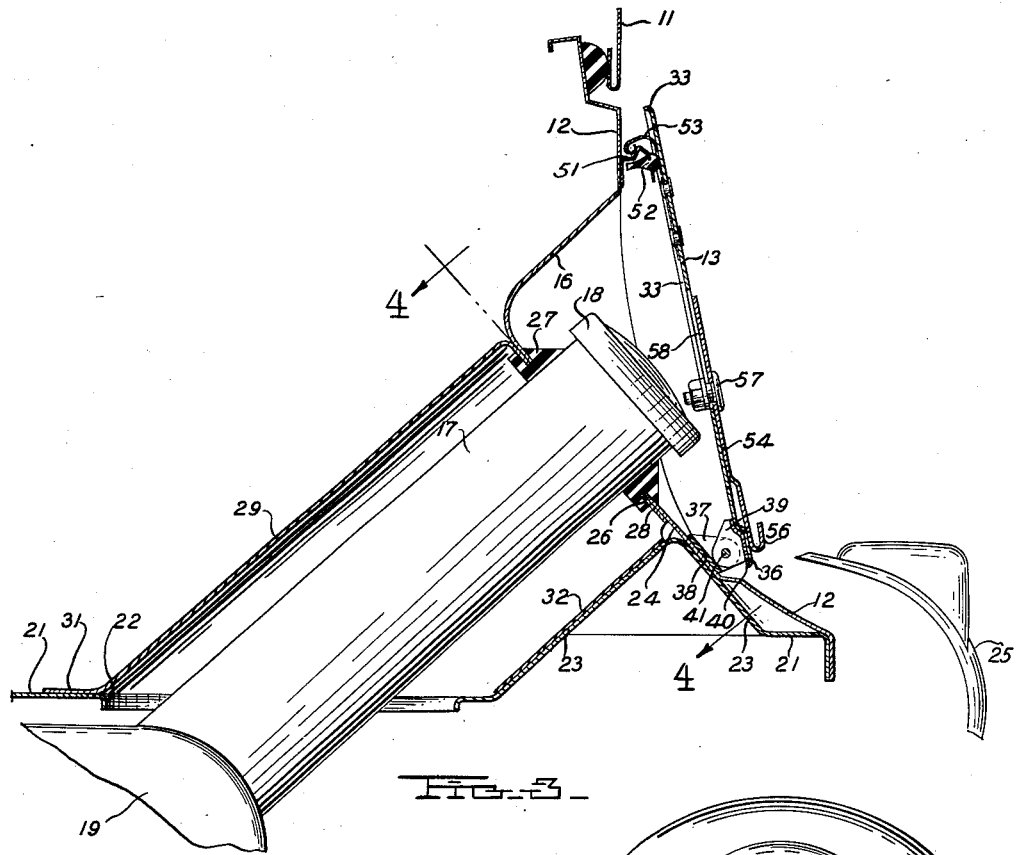
Figure 3 is a vertical cross-sectional view taken on the line 3—3 of Figure 2.

As best seen in Figure 3, the central portion of the lower back body panel 12 is formed with a depression 16 into which the upper end of the fuel tank filler tube 17 extends. The filler tube 17 is provided with a conventional removable cap 18 at its upper end, and it will be seen that the tube is inclined upwardly and rearwardly from the upper rear corner of the fuel tank 19 carried by the vehicle chassis (not shown) beneath the floor panel 21 of the luggage compartment. The floor panel 21 is formed with a flanged opening 22 through which the filler tube projects.

Adjacent its rearward end, and in the transverse center of the vehicle, the floor panel 21 is formed with an upwardly extending boss 23, the rearward portion of which is arranged in juxtaposition with the bottom wall 24 of the depressed portion 16 of the back body panel 12.

It will be noted that the lower back body panel 12 and the floor panel 21 of the luggage compartment terminate adjacent their rearward extremities in downwardly depending flanges suitably secured together and that the forward edge of the upper flange of the rear bumper 25 extends forwardly over the rearward edges of the panels 12 and 21 to provide an overlapped condition. This arrangement eliminates the necessity for a separate sheet metal stone guard.

Figures 4, 6:
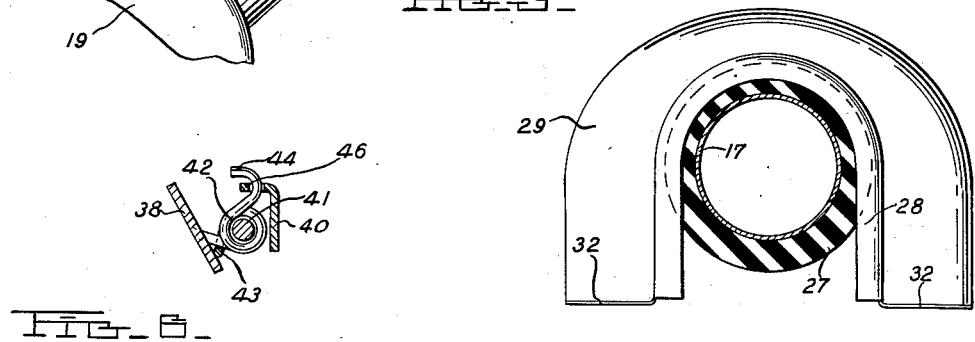
Figure 4 is a cross-sectional view taken on a line 4—4 of Figure 3.
Figure 6 is a vertical cross-sectional view taken on the line 6—6 of Figure 2.
Figure 5:
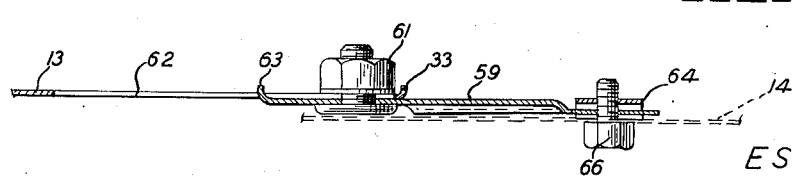
Figure 5 is a horizontal cross-sectional view taken on the line 5—5 of Figure 2.

The bottom wall 24 of the depression is provided with a circular opening 26 providing clearance for the filler tube 17 projecting therethrough. The filler tube is resiliently held in the opening 26 by means of a rubber grommet 27 encircling the filler tube and embracing the bottom wall 24 of the depression. The grommet also embraces the rearward flange 28 of a generally U-shaped shield 29 partially encircling the filler tube and shielding the latter from the interior of the luggage compartment. As best seen in Figures 3 and 4, the U-shaped shield 29 is open in its rearward side and its lower extremity is provided with a flange 31 seated upon and secured to the floor panel 21 of the luggage compartment. Laterally outwardly extending flanges 32 are formed at the rearward edges of the U-shaped shield 29 and lie against and are secured to the forward wall of the embossed portion 23 of the floor panel 21.

It will be noted that the length of the filler tube 17 as thus arranged in the vehicle body is relatively short and can be rigidly connected to the fuel tank without the necessity of providing a flexible connection therewith. It will also be seen that the sheet metal construction adjacent the filler tube is simplified as compared to the usual arrangement in which the filler tube projects through the wheel housing and side body panel or rear fender of the vehicle.

In the embodiment of the invention shown, the depression 16 in the back body panel 12 is normally concealed from view by means of a cover 13 overlying the marginal edges of the depression and pivotally mounted along its lower edge to the back body panel 12. The cover 13 is provided with an inturned marginal flange 33 along its side and upper edge, with reinforcing ribs 34, and with an offset ledge or flange 36 at its lower edge.

The cover 13 is pivotally mounted to the back body panel 12 by means of a hinge comprising upper and lower hinge members. The lower hinge member is generally U-shaped and has apertured end flanges 37 integral with a base 38, the latter being secured to the bottom wall 24 of the depressed portion 16 of the back body panel. The upper hinge member likewise is U-shaped and has apertured end flanges 39 integral with a base 40 which is secured to the lower edge of the cover 13. A hinge pin 41 pivotally connects the two hinge members and extends through the apertured end flanges.

A coil spring 42 encircles the hinge pin 41 and has two separated coiled portions joined by a straight portion 43. The free ends 44 of the spring extend upwardly and are anchored in apertured tabs 46 bent inwardly from the base 40 of the upper hinge member. As shown in Figure 6, the straight portion 43 of the spring 42 rests against the base 38 of the lower hinge member.

The spring is torsionally stressed during assembly to exert a constant force upon the cover 13 urging the latter toward its normal upright closed position as seen in Figure 3. A bracket 51 secured to the lower back body panel 12 carries a rubber bumper 52 forming a stop for the cover in its closed position. A spring clip 53 is riveted to the cover 13 and is arranged to snap over the bracket 51 to detachably hold the cover in its closed position.

Inasmuch as the license plates of the various states vary considerably in size, means are provided on the cover 13 for accommodating plates of different widths and heights. The plate 13 is relatively narrow and is of such size as to adequately cover the depression 16 and at the same time being covered, at least in width, by the smaller sizes of license plates so as to be substantially concealed thereby. The lower edge of the license plate is held in place against the cover 13 by means of a lug 54 having a hook-shaped lower end 56 adapted to engage the lower edge of the lower license plate. The lug 54 is secured to the cover 13 by means of a bolt 57 extending through a slot 58 in the plate to permit vertical adjustment to accommodate license plates of various heights. A pair of elongated transversely extending lugs 59 are adjustably carried by the cover 13 adjacent the upper portion of the latter. Each lug 59 is held in place by means of a bolt 61 extending through a slot 62 formed in the cover. An inwardly extending flange 63 at the inner edge of each lug 59 also extends into the slot 62 and prevents rotation of the lug 59 about the bolt 61. Speed nuts 64 are carried by the lugs 59 adjacent their outer extremities and are adapted to be engaged by bolts 66 extending through the holes or slots provided adjacent the upper edge of the license plate to secure the latter thereto. It will be apparent that lugs 59 can be readily adjusted transversely of the cover 13 to accommodate license plates of various widths.

While the drawings show a flat sheet metal cover 13 forming a support for the license plate 14 and overlying the depression 16 in the back body panel, the invention also contemplates the provision of a skeleton bracket suitably pivotally mounted upon the back body panel and having means thereon for supporting a license plate. With an arrangement of this type the license plate itself forms the cover for the outer end of the filler tube and the depression formed in the body panel.

The above described construction thus not only simplifies the construction of the fuel tank filler tube and the fabrication of the adjacent body panel but improves the appearance of the vehicle by eliminating the cap or lid normally located on the side of the body. In addition, being centrally located, the filler tube is in the ideal position for filling the fuel tank from either side of the vehicle. Further simplification of construction with resulting economy is effected by combining the functions of the license plate bracket and the filler tube lid so that the license plate and/or bracket upon which it is mounted conceals the filler tube and cap from normal vision. The spring urging the license plate toward its normal upright position eliminates the possibility that the license plate may be inadvertently left in its lower position in which the information thereon would be concealed from view.

It will be understood that the invention is not to be limited to the exact construction shown and described, but that various changes and modifications may be made without departing from the spirit and scope of the invention, as defined in the appended claims.

What is claimed is:

1. In a motor vehicle body having a luggage compartment located at the rearward end thereof with an opening formed in its floor, a fuel tank mounted below said luggage compartment floor, a filler tube extending upwardly in a rearwardly inclined direction from said tank through the opening in said floor, a generally vertically extending stationary back body panel extending upwardly from the luggage compartment floor and having a depression formed therein into which the upper end of said filler tube extends, an arcuate sheet metal panel shielding the portion of said filler tube between the luggage compartment floor and the back body panel and spaced from said filler tube, a bracket overlying the depression formed in said back body panel, adjustable means on said bracket for mounting license plates of various sizes thereon, means pivotally mounting said license plate bracket for swinging movement about a substantially horizontal axis between a normal upright position in which said license plate substantially covers the depression formed in said back body panel and a lower position in which said depression and said filler tube end are accessible to permit said fuel tank to be filled, and spring means constantly urging said bracket and license plate toward the first mentioned upright normal position.

2. In a motor vehicle body having a luggage compartment located adjacent the rearward end thereof, a luggage compartment lid for said luggage compartment pivotally connected at its forward end to said vehicle body, a generally horizontal floor panel for said luggage compartment, a fixed generally vertical back panel beneath said luggage compartment lid and extending upwardly from said floor panel adjacent the rearward edge thereof, a fuel tank mounted beneath the floor panel of said luggage compartment, a filler tube extending upwardly from said tank, said filler tube being inclined upwardly and rearwardly and extending through openings formed in said floor panel and said back panel beneath said luggage compartment lid, a cover pivotally mounted upon said back panel for swinging movement about a horizontal axis from an upper generally vertical position overlying the upper end of said fuel tank filler tube to a lower position exposing the filler tube end for filling purposes, adjustable means on said cover for mounting license plates of various sizes thereon, and means for holding said cover in its normal upright position.

3. The structure defined by claim 2 which is further characterized in that the portion of said filler tube extending through said luggage compartment is enclosed by a shield extending between said floor panel and said back panel, and a resilient grommet carried by said back panel adjacent the opening formed therein, said grommet embracing said filler tube and sealing the opening between said filler tube and said back panel.

4. The structure defined by claim 2 which is further characterized in that said back panel is depressed inwardly adjacent the longitudinal center plane of the vehicle body and the opening in said back panel is formed in the floor of said depression, said cover being of sufficient size to overlie the boundaries of the depression in said back panel to conceal the latter and the upper end of the filler tube from normal vision.

5. In a motor vehicle body having a luggage compartment located adjacent the rearward end thereof, a luggage compartment lid for said luggage compartment pivotally connected at its forward end to said vehicle body, a generally horizontal floor panel for said luggage compartment, a fixed generally vertical back panel beneath said luggage compartment lid and extending upwardly from said floor panel adjacent the rearward edge thereof, a fuel tank mounted beneath the floor panel of said luggage compartment, a filler tube extending upwardly from said tank, said filler tube being inclined upwardly and rearwardly and extending through openings formed in said floor and said back panel, a cover pivotally mounted upon said back panel beneath said luggage compartment lid for swinging movement about a horizontal axis from an upper generally vertical position overlying the upper end of said fuel tank filler tube to a lower position exposing the filler tube end for filling purposes, license plate mounting lugs carried by said cover at each side thereof and adjustably mounted thereon for extension beyond the side boundaries of said cover to provide for license plates wider than said cover, spring means constantly urging said cover toward its normal upright position, a resilient bumper forming a stop limiting the upward swinging movement of said cover, and means releasably holding said cover in its upright position.

6. In a motor vehicle body having a luggage compartment located adjacent the rearward end thereof, a generally horizontally extending luggage compartment lid for said luggage compartment pivotally connected to said vehicle body, a generally horizontal floor panel for said luggage compartment, a stationary back body panel extending transversely of said vehicle body beneath the rearward edge of said luggage compartment lid, a fuel tank mounted beneath said luggage compartment floor, a filler tube extending upwardly from said tank, said filler tube being inclined upwardly and rearwardly and extending through said stationary back body panel, a cover pivotally mounted upon said back body panel for swinging movement about a horizontal transversely extending axis located beneath the rearward end of said filler tube, said cover being movable from an upper generally vertical position overlying the upper end of said filler tube to a lower position exposing the upper end of the filler tube for filling purposes, means on said cover for mounting a license plate thereon, the upper edge of said cover and said license plate in their upper vertical positions being beneath the rearward edge of said luggage compartment lid, spring means constantly urging said cover toward its upper vertical position, and stop means limiting the upward swinging movement of said cover.

7. In a motor vehicle body having a luggage compartment located adjacent the rearward end thereof, a generally horizontally extending luggage compartment lid for said luggage compartment pivotally connected at its forward end to said vehicle body, a generally horizontal floor panel for said luggage compartment, a stationary generally vertical back body panel extending transversely of said vehicle body beneath the rearward edge of said luggage compartment lid, said back body panel having a depression formed therein with an opening in the base of said depression, a fuel tank mounted beneath said luggage compartment floor, a filler tube extending upwardly from said fuel tank, said filler tube being inclined upwardly and rearwardly and extending into said depression through the opening in the base thereof, said depression being only slightly larger in vertical and transverse dimensions than the rearward end of said filler tube, a license plate holder pivotally mounted upon said stationary back body panel adjacent said depression and pivotally connected to said panel and having means thereon for supporting a license plate, said holder and supported license plate being swingable about said pivotal connection to said stationary back body panel from an upper generally vertical position overlying and concealing the upper end of said filler tube and said depression to a second position exposing the upper end of said filler tube for filling purposes, the upper edge of said holder and said license plate in the first mentioned upper generally vertical position being beneath the rearward and lower edge of said luggage compartment lid, spring means constantly urging said holder and said license plate toward said upper vertical position, and stop means limiting the swinging movement of said holder and said license plate toward said stationary back body panel.

References Cited in the file of this patent

UNITED STATES PATENTS

| Number | Name | Date |
|---|---|---|
| 1,989,995 | Martin | Feb. 5, 1935 |
| 2,035,895 | Kelly | Mar. 1, 1935 |
| 2,113,616 | Flogaus | Apr. 12, 1938 |
| 2,131,306 | Walker | Sept. 27, 1938 |
| 2,314,710 | Keller | Mar. 23, 1943 |
| 2,474,974 | Fulton | July 5, 1949 |
| 2,508,124 | Stephenson | May 16, 1950 |
| 2,575,211 | Flacke | Nov. 13, 1951 |

FOREIGN PATENTS

| 777,507 | France | Nov. 26, 1934 |